Dec. 22, 1931.  F. R. BUCHANAN  1,837,405
TOOL
Filed April 24, 1929
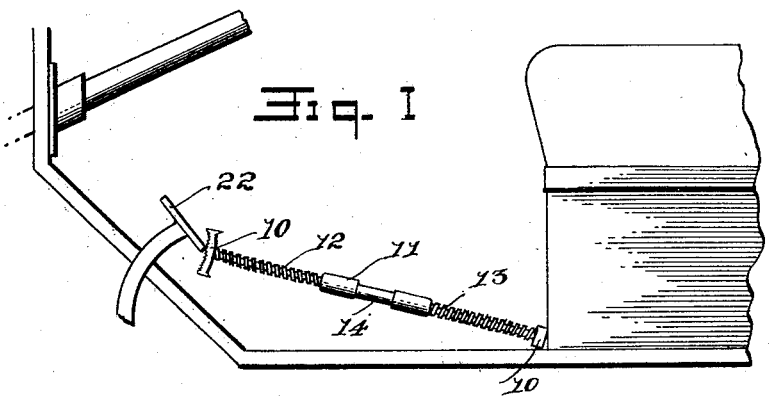
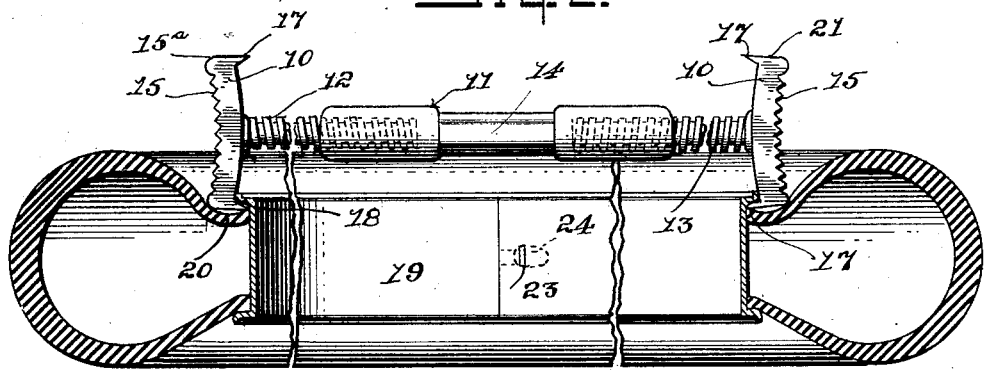
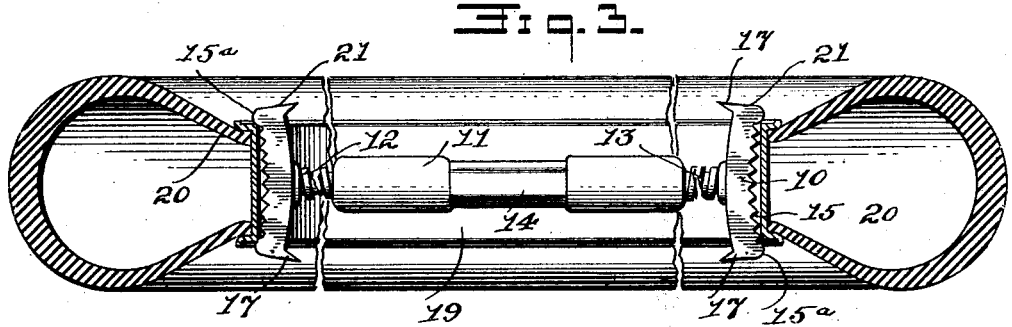
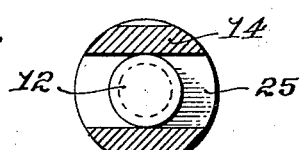
INVENTOR.
FrederickR.Buchanan
BY
Joshua R H Potts
ATTORNEY.

Patented Dec. 22, 1931

1,837,405

UNITED STATES PATENT OFFICE

FREDERICK R. BUCHANAN, OF WHITE MARSH, PENNSYLVANIA

TOOL

Application filed April 24, 1929. Serial No. 357,621.

The present invention relates to tools and has for an object to provide a tool which may be used effectively in a variety of applications thereof.

A further object is to provide a tool which may be used effectively for holding the brake pedal of an automobile depressed while the brake bands are being adjusted and which may be adjusted for this purpose.

A still further object is to provide a tool which is simple of construction and effective both for holding a pedal depressed and for mounting and dismounting a tire from its rim.

The tool by which the above objects are accomplished consists of two heads connected by an arm, which arm may be adjustable if so desired.

The heads may be provided with gripping surfaces and are connected to the ends of the arm. The gripping surfaces may also be curved to better hold to the objects with which they are used. The opposite ends of the heads may be furnished with cleats of suitable shape to be inserted between the side flanges of a rim and a tire mounted thereon for contracting the rim in removing a tire, and these members may be wedge-shaped and extended from the opposite faces of the heads from those formed with gripping surfaces.

A better understanding of the principles of the invention will be had by consideration of a specific embodiment thereof as illustrated in the accompanying drawings, in which, Figure 1 shows the application of the tool to the holding of a brake pedal of an automobile depressed, Figure 2 is a sectional view on an enlarged scale showing the tool as applied to a rim in the dismounting of a tire therefrom, Figure 3 is a section similar to that in Figure 2 showing the application of the tool to the mounting of a tire on a rim, and Figure 4 is a cross-sectional detail showing the relation of the turn-buckle to one of the arm members.

As set forth in the preceding paragraphs, the tool is of a combination character, being constructed so as to adapt it to a variety of uses, certain of the elements thereof cooperating with the effective use of the tool in the various situations in which the tool is to be used.

Uses by way of example to which the tool is adapted are that of an adjustable brace member for holding a member as the brake lever of an automobile depressed while the brake bands are being adjusted to an equality of braking friction and that of contacting and expanding of the rim of a wheel in the dismounting and mounting of a tire thereon.

It is to be understood, however, that the tool may find many other adaptations and uses without materially changing the construction thereof.

In its principal features, the tool comprises heads 10 connected by an arm 11, the arm comprising shanks 12 and 13 extending from the respective heads and adjustable to and from each other in any suitable manner, as by a turn-buckle 14 threadedly connected to the shanks 12 and 13 in a well known manner, the shanks being provided respectively, as is usual in situations of this character, with right and left hand threads, this construction being clearly illustrated in Figure 2 of the drawings.

The heads are provided on their outer faces with a gripping surface, as shown at 15, which may be in the nature of ribs or corrugations such as shown in the drawings. These heads may also be slightly curved to minimize the possibility of their slipping off of the member with which they are used, as clearly illustrated in the drawings.

The heads are also provided with hook members or lugs at the ends thereof and on opposite sides of the attachment of the shanks to the heads. Such members are shown at 17 as being in the nature of wedge-shaped elements adapted to be inserted between the flange 18 of a rim 19 and the tire 20 for contacting the rim to permit of easy dismounting of the tire. See Figure 2.

The location of these lugs is at the outer ends of the heads and, as shown, on the inner faces thereof, or the faces opposite to that on which the gripping surfaces are formed. The ends of the heads on the gripping surface is provided with rounded portions 15ª serving, when the head is rested against a polished surface or the like, to protect the same against being marred or injured. These rounded portions project beyond the grippings surfaces 15 as clearly shown.

The end surfaces of the heads may also be slightly curved, as at 21, to conform to the curvature of a tire adjacent its seat in the rim.

In the use of the tool in connection with the tightening of brake bands, the same may be set as shown in Figure 1 of the drawings with one head 10 resting against the seat support and the other head resting on the brake pedal 22. Pressure of the brake pedal may be adjusted by means of the turn-buckle 14 until one of the brake bands comes into contact with its related drum. The other brake band may then be adjusted to an equalization with the first.

In using the tool to dismount a tire from its rim the hooks or lugs 17 may be hooked over the flange of the rim as shown in Figure 2, after which the turn-buckle may be tightened, contracting the rim and releasing the tire therefrom.

Use of the tool in mounting a tire on a rim is illustrated in Figures 2 and 3 of the drawings. The rim may first be contracted, as in Figure 2, the tire slipped on and then the tool may be set as in Figure 3 and pressure exerted thereby on the inner surface of the rim to spread the rim outwardly against the tire and bring the lug 23 into engagement with aperture 24 to latch the ends of the rim together.

Other uses of the tool are possible, as the use as a jack, one head resting on the ground and the other under an object to be raised. A suitable lever may be used inserted through the opening 25 through the turn-buckle in exerting turning force thereon when the tool is used for this purpose.

From the above description it will appear that I have provided a tool of great adaptability, the various parts of which may serve and assist in the employment of the tool for widely diverse uses, this adaptability being accomplished by a very slight variation in the construction of the tool over what would be useful and advantageous in any one of the uses to which the tool may be put.

It is further to be noted that I have provided a tool which, in addition to being applicable to a diversity of uses, may be contracted into a very compact form for storage, the length of the tool when contracted to its inner limits being substantially only half of its maximum extension.

In conclusion, it is to be understood, of course, that various changes as to details of construction may be resorted to in the manufacture of the above described tool within the scope of the invention as hereinbefore set forth and hereinafter claimed.

Having described my invention, what I claim is:—

1. A tool comprising a pair of spaced curvilinear heads, the concave side of each being striated and the convex side provided with terminal wedge-shaped extensions, and means to apply interval-varying stress to the heads.

2. A tool comprising a pair of spaced curvilinear heads, the concave side of each being striated along lines parallel with the axis of curvature and the convex side provided with terminal wedge-shaped extensions, and means to apply interval-varying stress to the heads.

3. A tool comprising a pair of spaced curvilinear heads, the concave side of each being striated and the convex side provided with terminal wedge-shaped extensions outstanding in approximate radiality to the curvature, and means to apply interval-varying stress to the heads.

4. A tool comprising a pair of spaced curvilinear heads, the concave side of each being striated and the convex side provided with terminal wedge-shaped extensions, the remote ends of said head coinciding with converging lines including the remote sides of said wedge-shaped extensions, and means to apply interval-varying stress to the heads.

5. A tool comprising a pair of spaced curvilinear heads, the concave side of each being striated along lines parallel with the axis of curvature and the convex side provided with terminal wedge-shaped extensions outstanding in approximate radiality to the curvature, and means to apply interval-varying stress to the heads.

6. A tool comprising a pair of spaced curvilinear heads, the concave side of each being striated along lines parallel with the axis of curvature and the convex side provided with terminal wedge-shaped extensions outstanding in approximate radiality to the curvature, the remote ends of said head coinciding with converging lines including the remote sides of said wedge-shaped extensions, and means to apply interval-varying stress to the heads.

7. A tool comprising a pair of spaced arcuate heads, the concave side having its terminal corners similarly rounded and the remote edges extended beyond the convex side and wedges extending from the remote ends of the convex side formed in part by said extended edges, and means to apply interval-varying stress to the heads.

8. A tool comprising a pair of spaced arcuate heads, the concave side having its terminal corners similarly rounded and the remote edges extended beyond the convex side and wedges extending from the remote ends of the convex side formed in part by said extended edges, and means connected with the convex side to apply interval-varying stress to the heads.

In testimony whereof I have signed my name to this specification.

FREDERICK R. BUCHANAN.